United States Patent [19]
O'Hanlon

[11] 3,986,491
[45] Oct. 19, 1976

[54] SUMMER AND WINTER SOLAR HEAT COLLECTOR

[76] Inventor: Edward J. O'Hanlon, Assembly Point, Warren County, Lake George, N.Y. 12845

[22] Filed: Jan. 15, 1975

[21] Appl. No.: 541,109

[52] U.S. Cl. ............................................. 126/271
[51] Int. Cl.² ........................................... F24J 3/02
[58] Field of Search ............. 126/270, 271; 237/1 A

[56] References Cited
UNITED STATES PATENTS

| | | | |
|---|---|---|---|
| 921,976 | 5/1909 | Glass | 126/271 |
| 2,783,682 | 3/1957 | Swenson | 126/271 |
| 3,076,450 | 2/1963 | Gough et al. | 126/271 |
| 3,145,707 | 8/1964 | Thomason | 126/271 |

FOREIGN PATENTS OR APPLICATIONS

| | | | |
|---|---|---|---|
| 257,425 | 6/1961 | Australia | 126/271 |
| 686,641 | 3/1965 | Italy | 126/271 |

*Primary Examiner*—William F. O'Dea
*Assistant Examiner*—James C. Yeung

[57] ABSTRACT

A reduction of first cost and an increase in solar heat collection efficiency are primary considerations. Heat absorbing liquid is confined to a narrow unobstructed path, with wide flairing wings exposed directly to the sun. The need for painted heat absorbing surfaces is largely eliminated. Transparent or translucent cover is easily removable and replaceable.

1 Claim, 4 Drawing Figures

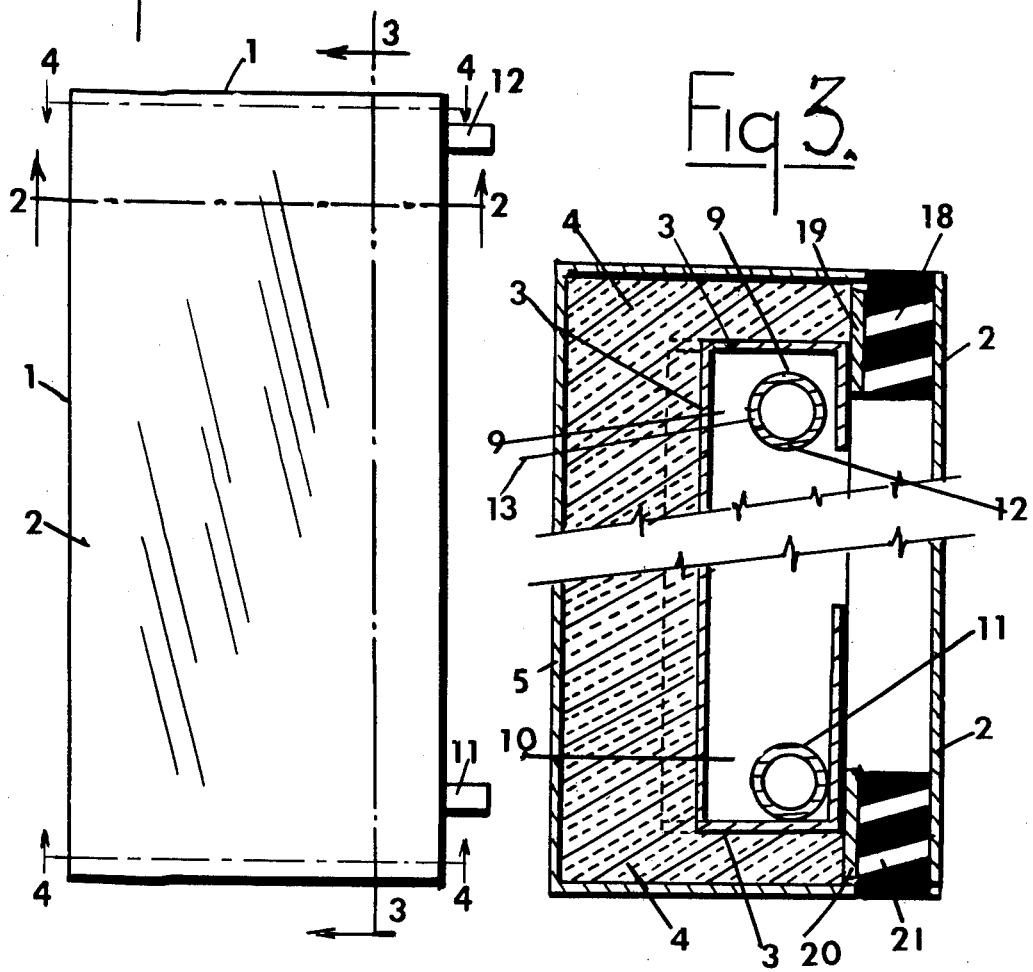
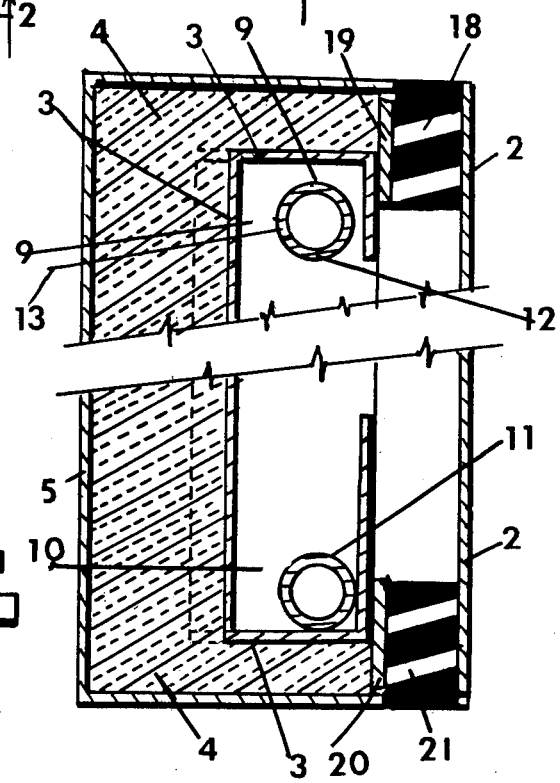
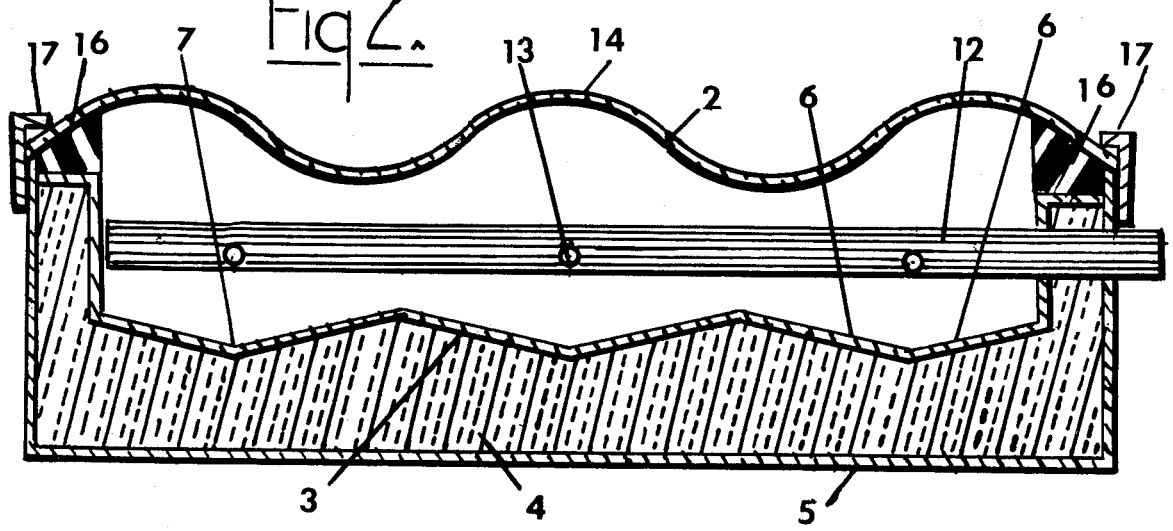

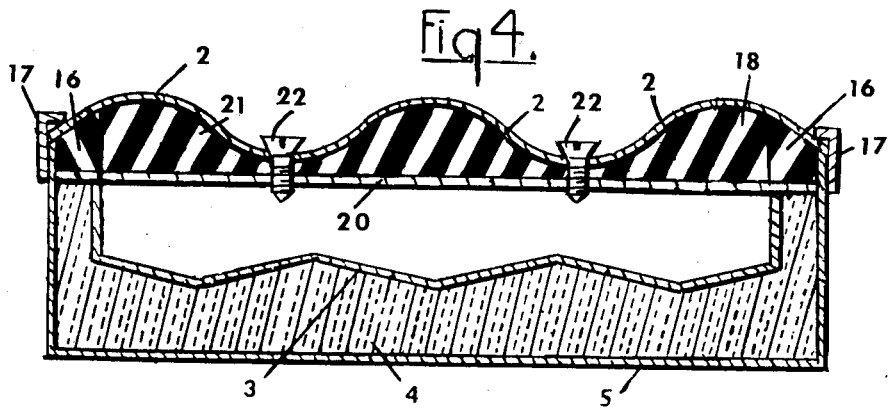

SUMMER AND WINTER SOLAR HEAT COLLECTOR

My present invention clearly distinguishes from the standard sheet of corrigated metal or the serpentine tube arrange as is customary in the design of solar heat collectors. It is also quite different from the pairs of thin metal plates, usually placed surface to surface with suitable pipe lines embossed to resemble a serpentine tubular path for the heat absorbing liquid to follow while collecting solar heat.

In my improved device there is no metal between the solar heat collecting liquid and the solar rays themselves. My transparent or translucent cover over the solar heat collecting surface is easily removable and replaceable for summer and winter use. Preferably it is a sheet of fibrous (fibreglass) reinforced transparent or translucent heat hardened plastic, in this case, polyester resin modified with clear acrylic, assuring the maximum transmission of the sun's rays, through a removable cover substantially unbreakable.

Since my heat collecting surface is composed of valleys and hills which guide the heat absorbing liquid downward, and due to its narrow path through the valleys, prevent it from spreading itself broadly across the solar heat collecting surface, the wide flairing wing like hills of this same surface assure the maximum solar heat pick-up and its rapid transfer to the liquid in its unobstructed downward path.

Rather than paint the solar heat collecting sheet metallic surface, I prefer to either oxidize or anodize this surface to a dark heat absorbing color (preferably black). Paint too often interferes with the swift and positive heat reception by the solar heat collecting plate. My purpose is to forgo this same obstacle to rapid solar heat collection. Solar heat must travel as rapidly as posible from the sun into the heat collecting plate and then from the hills of the plate to the water running down its valleys. In this way a small proportion of the heat collector plate is wet by the liquid taking away the solar heat collected.

When my solar heat collector faces the south, as the solar rays across its surface move from the east to the west during the morning and afternoon, the wide flairing hills in my metallic solar heat collecting plate, receive the maximum solar heat during the hours the sun is up and the solar heat collector is functioning. As a transparent or translucent surface above and across the metallic heat collecting surface, with a proper space prevailing between these two surfaces, I prefer to use for the purpose of strength and non-bendability a sheet of corrigated plastic, whose corrigations as far as possible focus the rays of the sun on one side of the flairing hills in the morning, and focus the solar rays on the opposite side of the hills during the afternoon when the sun is out and shining on my collector. Nothing like this has ever been approached in previous solar heat collectors to my personal knowledge.

As a result, my metallic solar heat absorbing plate with its hill and valley indentation cam can better absorbe the early morning solar heat, and the late afternoon's rays of the declining solar heat source. This is an improvement largely previously either ignored or neglected in former solar heat collectors.

Painted surfaces not only interfere with maximum solar heat transfer but represent a maintainence problem because they do not always stay painted. This particular improvement in my solar heat collecting equipment amounts to a reduction in to cost of operating my solar heat collecting facility.

Another feature is the narrowness of my heat collecting path, diminishing the amount of liquid surface that can reflect the sun's rays outward again, after these same rays have impinged upon the travelling liquid's surface. By keeping the heat absorbing liquid's path as narrow as possible, this return outward reflection of solar rays is kept at a minimum, a solar heat collection phenomena probably not completely previously well understood.

While the corrugated transparent or translucent fibrous reinforced plastic surface needs to be sufficiently tight to prevent the escape of valuable solar heat once it has been absorbed in the collector, I have accomplished this needed tightness by strips of sponge rubber under the edges of the corrigated sheet, plane strips running lengthwise the collector and strips with a corrugated upper surface to conform with the corrigations in the plastic sheet, permitting the corrugated sheet to be fastened down with screws inserted in the heat collector at the low places in the corrigations of the corrugated sheet, across the collector ends. This arrangement permits the easy removal of the corrugated sheet in the summer time if this is found to be desirable.

In the drawings,

FIG. 1 is a plan view of my solar heat collector.

FIG. 2 is a sectional view taken along the lines 2—2 in FIG. 1.

FIG. 3 is a sectional view taken along the lines 3—3 in FIG. 1.

FIG. 4 is a section taken along 4—4 in FIG. 1.

My improved solar heat collector is here indicated by the numeral 1. Its exterior corrugated plastic surface numeral 2 covers solar heat collecting plate 3 resting on plastic foam 4 in heat collector tray 5.

As will be noted the heat collector plate 3 is provided with wide flairing hill portions 6 at an angle upward from each side of valley portion 7, these hill and valley indentations running lengthwise the heat collecting and transmitting plate from its upper portion 9 to its lower portion 10.

At 10 this heat collector plate is turned upward to comprise a reservoir for solar heated liquid which has run down the valleys 7 and is to exit through pipe 11 as shown in FIG. 1. Numeral 12 in all figures of the drawing represent the liquid distributing manifold through which the solar heat pick-up liquid enters my solar heat collector. The numeral 13 are the holes in this upper most positioned liquid entering manifold (or tube) by which each valley 7 in the heat collecting metal sheet or plate 3 receive the liquid needed to acquire the incomming solar heat.

It will be noted that the corrugations in the transparent or translucent corrugated sheet 2 are so arranged to focus the rays of the sun in the morning on one side of the hill indentations 6, and on the other side of the hill indentations 6 in the afternoon. Since the corrugated sheet has circular cross sectioned surfaces, these same surfaces tend to act somewhat as a magnifying glass in assembling the solar rays and causing them to impact the valleys 7 and the flaired hill portions 6 of of the sheet metal heat collecting plate 3 below. These upward surfaces in the corrugated sheet are here designated by the numeral 14 in the drawings. My heat absorbing liquid can contain black powder.

At numerals 16 and 16 I show longitudinal strips of sponge rubber positioned to make fairly heat leak tight the space between the corrugated sheet 2 and the metallic solar heat collector plate 3. These are glued in place by a suitable adhesive material and the corrugated sheet is held down in position by a holding angle metal strip 17 along each of the two sides of the solar heat collector. My liquid can be dyed black.

Across the two ends of the corrugated sheet, that is, at each end of solar heat collector 1, numeral 18 in FIG. 3 shows the upper strip of sponge rubber glued along its uncorrugated bottom surface to a flat strip of elongated sheet metal 19 welded to metallic solar heat collector plate 3. In similar manner along the width of solar heat collector sheet 3 is welded a similar strip of sheet metal 20 to which the non-corrugated bottom of sponge rubber strip 21 is suitably glued.

The upper surfaces of sponge rubber cross strips 18 and 21 are properly corrugated to conform with the corrugations in the corrugated plastic plate into which they fit. At the low points in the corrugated plastic sheet, holding screws 22 are inserted to hold the corrugated plastic sheet firmly to each end of the solar heat collector 1.

Previous solar heat collectors work but not efficiently as is required. It is believed that my apparatus as herein disclosed represents over all a distinct advance in the solar heat collector art at this particular time.

I claim:

1. A solar heat collecting panel, comprising a tray, a metallic darkened surface within said tray, plastic foam heat insulation between said tray and said darkened solar heat collecting sheet metallic surface, said surface having alternate ridges and valleys running lengthwise said sheet metallic surface, a solar light and heat penetrating fibrous reinforced heat hardened corrugated plastic surface, spaced apart from said hill and valley darkened sheet metal surface, and fastened firmly to the sides and the ends of said tray, resilient means sealing the space between said tray and said solar light and heat penetrating corrugated plastic surface, screws positioned in and penetrating said resilient means and the concave portions of said corrugated sheet plastic surface, and also penetrating and being fastened into said tray across one end of said corrugated plastic surface, a liquid admitting manifold near one end of said metallic surface with holes positioned within said manifold to direct streams of solar heat collecting liquid from said manifold into the valley portions of said solar heat collecting darkened sheet metallic surface, and means for removing solar heated liquid from the end of the heat gathering darkened sheet metallic surface opposite to the end of the sheet metallic surface where said solar heat gathering liquid was first admitted in order to flow down through said darkened sheet metallic valleys.

* * * * *